UNITED STATES PATENT OFFICE.

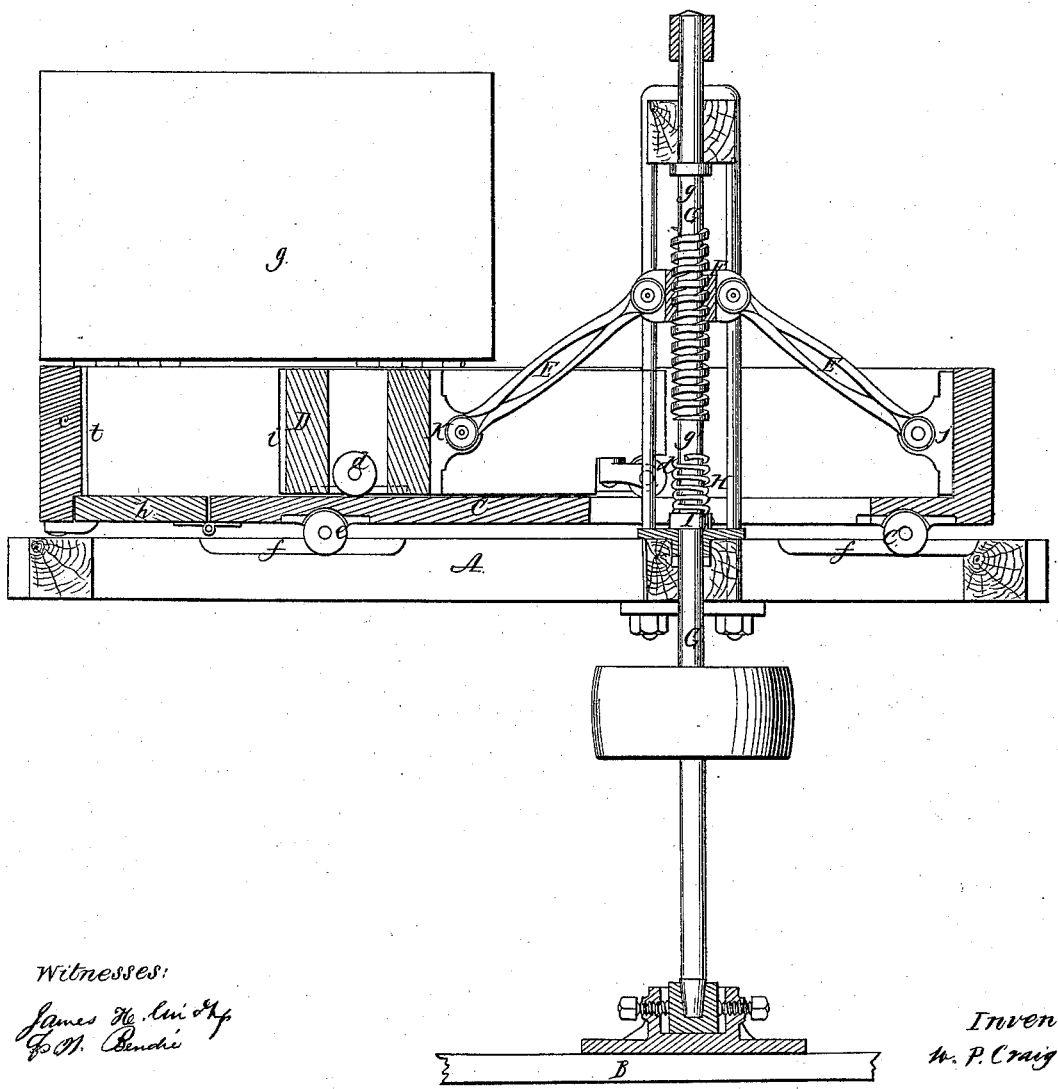

WALDO P. CRAIG, OF NEWPORT, KENTUCKY.

IMPROVEMENT IN COTTON-PRESSES.

Specification forming part of Letters Patent No. 32,240, dated May 7, 1861.

*To all whom it may concern:*

Be it known that I, WALDO P. CRAIG, of Newport, Campbell county, Kentucky, have invented a certain new and useful Press for Cotton, Hay, &c.; and I do hereby declare the following to be a full, clear, and exact description thereof, reference being had to the accompanying drawing, making part of this specification.

My invention relates to a provision for releasing the nut at either end of the screw, so as to prevent injury to the press mechanism by accidental overrunning of the screw, together with a device for restoring the nut to the screw on the instant of the reversal of the latter.

The accompanying drawing represents a longitudinal or axial section of a press embodying my improvements.

A represents the floor of the room occupied by the press, between which and floor B attachments can be made for animal or steam power. C is a long rectangular box or frame, between the head c of which and follower D the cotton or hay is packed and pressed. Box C rests on rollers e e, adapted to traverse backward and forward in ways f f, and is provided with a cover, g, (adapted to be securely fastened when the material is under manipulation,) and a hinged bottom, h, through which the bale is allowed to fall after pressing and tying. The heads c and D are provided with a series of slats, i, between which the ties may be inserted for the proper securing of the bale before the press is released. The follower D rests on rollers d, adapted to traverse the bottom of box C. The box C and follower D are connected at j k, respectively, to toggle-joint arms E E, both of which connect to a common screw-box, F, which latter is devised to have a direct vertical reciprocating motion imparted to it by screw-shaft G. It will be perceived that as the box F is lowered and the arms E straightened or brought in line with each other the heads c D travel in opposite directions and approach each other, and the cotton or hay is thus condensed to the required dimensions. This press, by the peculiar arrangement of toggle-joint and screw, exerts its greatest power when the arms E are nearly approaching the straight line and the cotton or hay is most condensed, the speed being greatest when commencing to press. Thus the speed and power of the press in its motion are nearly proportioned to the requirements of the material under manipulation in its varying density, the power applied to the screw-shaft thus continuing uniform. The extent of the vertical motion of the box F is limited by providing blank spaces $g\ g'$ on shaft G, of diameter not greater than the bottom of the screw, as shown, so that an overrunning of shaft G in either direction will not injuriously affect the mechanism of the press. The box F, after passing the screw at the upper end, is (when the shaft is reversed) thrown in proper connection with the threads of screw by its own weight and that of the toggle-arms E, while at the lower end the coiled spring H, loosely slipped on between the screw and collar I, has been devised to serve the purpose of throwing the box in place when an upward motion is required, the spring being compressed (to insure returning elasticity) by the box F in passing over the end of the screw.

Disclaiming novelty in the separate or simultaneous movement of box and follower,

I claim as new and of my invention herein—

The peculiar arrangement of traveling box and follower C c e e D d d, toggle-arms E E, screw-shaft G $g\ g'$, and spring H, the whole being combined and adapted to operate substantially as set forth.

In testimony of which invention I hereunto set my hand.

W. P. CRAIG.

Witnesses:
 GEO. H. KNIGHT,
 FRANCIS MILLWARD.